United States Patent [19]

Osawa

[11] Patent Number: 4,820,543

[45] Date of Patent: Apr. 11, 1989

[54] METHOD OF STABLY FIXING AROMATIC COFFEE SUBSTANCE

[75] Inventor: Hide Osawa, Tokyo, Japan

[73] Assignee: Ajinomoto General Foods, Inc., Tokyo, Japan

[21] Appl. No.: 73,034

[22] Filed: Jul. 14, 1987

[30] Foreign Application Priority Data

Jul. 17, 1986 [JP] Japan .................................. 61-168699

[51] Int. Cl.$^4$ .......................... A23L 1/234; A23F 5/46
[52] U.S. Cl. .................................. 426/650; 426/594; 426/96; 426/98
[58] Field of Search ............................... 426/594, 650

[56] References Cited

U.S. PATENT DOCUMENTS

| | | | |
|---|---|---|---|
| 3,495,988 | 2/1970 | Balassa | 426/594 X |
| 3,979,528 | 9/1976 | Mahlmann | 426/594 |
| 4,007,291 | 2/1977 | Siedlecki et al. | 426/594 |
| 4,119,736 | 10/1978 | Howland et al. | 426/594 X |

OTHER PUBLICATIONS

Swern, Barley's Industrial Oil and Fat Products, vol. I, 4th Ed., 1979, John Wiley & Sons: N.Y., p. 315.

*Primary Examiner*—Joseph Golian
*Attorney, Agent, or Firm*—Linn I. Grim; Daniel J. Donovan

[57] ABSTRACT

A method for fixing an aromatic coffee substance by means of encapsulation is described using a medium chain triglyceride wherein the fatty acid portion consists of a fatty acid having from 6 to 12 carbon atoms. The method comprises mixing or homogenizing an oleaginous solution of an aromatic coffee substance with an aqueous solution to form an emulsion, extruding said emulsion, forming an encapsulated slurry and drying said slurry.

6 Claims, No Drawings

METHOD OF STABLY FIXING AROMATIC COFFEE SUBSTANCE

DETAILED DESCRIPTION OF THE INVENTION

The present invention relates to a method of stably fixing an aromatic coffee substance by means of capsulation. More particularly, the present invention pertains to a fixing method which comprises mixing under vigorous stirring or homogenizing an oleaginous solution of an aromatic coffee substance and a non-protein hydrophilic colloidal aqueous solution to form an emulsion, extruding or dropping this emulsion through a small bore into a solution which is insoluble in the discontinuous phase of the emulsion to form an encapsulated slurry, then dehydrating and drying this slurry, thus encapsulating the aromatic coffee substance without any fear of the volatile aromatic component being scattered and lost. According to the present invention, an aromatic substance whose volatile aromatic component is readily lost and difficult to fix, such as an aromatic coffee substance, is stabilized by encapsulating it without any heat treatment, thus enabling the aromatic coffee substance to be applied to a product which needs the addition of such an aromatic substance.

PRIOR ART

Since aromatic coffee substances are extremely volatile and unstable, the fragrance and flavor of various kinds of coffee product, for example, instant coffee, are often degraded during the steps of coffee manufacture or during the storage and distribution process. Various methods of stably fixing aromatic coffee substances have heretofore been proposed in order to solve the above-described problem.

According to one proposed method, an aromatic coffee substance is added to and mixed with an aqueous solution that contains dextrin, vegetable gum or the like in high concentration to form an emulsion and this emulsion is then spray dried. This method suffers, however, from the disadvantage that, since the material is exposed to a high temperature during the spray drying, the volatile component is scattered and lost.

According to another proposed method, an aromatic coffee substance is dispersed and dissolved in a thick solution of a saccharide such as sugar, and the solution is solidified, dried and powdered to thereby fix the aromatic substance in the saccharide. In this method, however, the aromatic substance is dispersed in and mixed with a heated thick saccharide solution. Accordingly, it is impossible to avoid scattering or degradation of the aromatic substance.

There is still another proposed method wherein an aromatic coffee substance is emulsified in water, and the emulsion is dropped into a finely-ground instant coffee powder, vibrated and then allowed to stand for an appropriate time to thereby coat the aromatic substance with the coffee powder. Although this method has been found to be effective to a certain degree, the aromatic substance cannot be adequately coated and therefore is considerably scattered and lost during storage and distribution.

According to a further proposed method, an oleaginous solution of an aromatic coffee substance and a non-protein hydrophilic colloidal aqueous solution are homogenized to form an emulsion, and this emulsion is dispersed in an agglutination solution of high viscosity which is insoluble in the dispersion phase of the emulsion to thereby obtain an encapsulated slurry (see U.S. Pat. No. 3,495,988). In this method, coffee oil is added to the solution of the aromatic coffee substance. As the agglutination solution, a mixture of alcohol and an alcohol-soluble substance, e.g., castor oil, is mentioned in the specification of this prior art.

This method suffers, however, from the following problems. When a product obtained according to this method is dissolved in a coffee beverage, the solution becomes turbid and the external appearance of the beverage is considerably degraded. The cause of this turbidity is considered to be the use of coffee oil in the oleaginous solution of the aromatic coffee substance as a raw material. Further, since castor oil is used, the storage stability of the final product is disadvantageously inferior.

PROBLEMS TO BE SOLVED BY THE INVENTION

The present invention aims at overcoming the above described disadvantages in various methods which have heretofore been proposed for stably fixing an aromatic coffee substance without any fear of it being scattered and lost, and it is an object of the present invention to provide a method which enables an aromatic coffee substance to be stably fixed easily and reliably.

MEANS FOR SOLVING THE PROBLEMS

The present inventors have succeeded in obtaining encapsulated particles by carrying out the steps of vigorously mixing an oleaginous solution of an aromatic coffee substance which contains as a solvent a medium chain triglyceride (MCT) composed of a fatty acid having from 6 to 12 carbon atoms and a non-protein hydrophilic colloidal thick aqueous solution or passing these solutions through a homogenizer to form an emulsion, extruding this emulsion into an agglutination solution which is non-toxic and insoluble in the emulsion and which contains MCT to obtain a slurry of encapsulated emulsion particles formed in the shape of threads, then dehydrating and drying (if desired) this slurry.

The encapsulated particles of aromatic coffee substance obtained by the method according to the present invention have the practical advantages that, when they are dissolved in water (either cold or hot water), there is no fear of the solution becoming turbid, and the aromatic stability during storage is considerably superior.

The aromatic coffee substance which can be employed in the method of the present invention may be a substance obtained from natural coffee by means of extraction or decomposition, or a substance prepared using a synthetic additive, or a mixture of these substances.

The aromatic coffee substance is dissolved in a solvent which is defined by a medium chain triglyceride alone or a mixture of MCT and coffee oil.

On the other hand, a non-protein hydrophilic colloidal aqueous solution of high viscosity is prepared in advance as a capsule forming agent. The above-described oleaginous solution of the aromatic coffee substance is added to this aqueous solution, and the mixture is vigorously stirred or put in an emulsifier to obtain an emulsion of the aromatic coffee substance. Non-protein hydrophilic colloidal substances which can be used in the present invention include: materials derived from starch, such as soluble starch and dextrin;

soluble cellulose materials such as carboxymethyl cellulose; vegetable gums such as gum arabic, tragacanth gum and locust bean gum; and non-toxic synthetic polymeric substances such as polyvinyl alcohol. However, it is possible to use a proteinaceous hydrophilic colloidal substance as a co-component, for example, gelatin, casein and soybean protein.

If necessary, a surface active agent which is edible and has no adverse effect on the aromatic coffee substance may be used for the purpose of promoting emulsification and to use a non- or low-whipping surface active agent, for example, polyoxyethylene, sorbitan monooleate, sucrose fatty acid ester, polyglycerin fatty acid ester, and polyoxyethylene sorbitan monolaurate.

To prepare an emulsion, the material is stirred with high shearing force by a conventional method, or homogenized by means of a homogenizer. The emulsion thus obtained is then extruded or dropped into an agglutination solution through a small bore. The agglutination solution is usually prepared by mixing together MCT and anhydrous ethanol. The solution is Preferably prepared at 2° to 15° C., more preferably 5° to 10° C., and the ethanol content in the solution is preferably set at between 95 and 80% by weight. In other words, the MCT content is preferably set at between 5 and 20% by weight, but MCT may also be used within a range from 5 to 50% by weight.

The agglutination solution mixed with the emulsion is gently stirred to prepare an emulsion dispersion (slurry). The hydrophilic colloidal substance which is contained in the emulsion and which is a capsule forming component sets to a gel in the agglutination solution, a slurry of gel particles thus being obtained.

Then, the gel particles are collected and added to a dehydrating bath for dehydration. Generally, the collection of gel particles is conveniently carried out by filtration, but may also be effected by centrifugal separation. As the dehydrating bath, anhydrous ethanol is preferably employed, but it is also possible to use propylene glycol, acetone and the like. The particle diameter is preferably set at about 10 to 10,000 microns at the time of dehydration, more preferably at 40 to 3000 microns.

The particles thus dehydrated are collected by, for example, filtration, and then dried under a mild condition. For example, the collected particles are dried under ventilation at room temperature so that the water content is lowered to about 10% or less, preferably about 5.5% or less, thereby obtaining a desired product. The drying process may be carried out at room temperature, but may also be conducted under heating at 70° C. in order to dry the dehydrated particles within a short period of time in the case of continuous production.

If desired, the dried particles may be further finely ground and sifted in order to make the particle size uniform.

It should be noted that the method of the present invention is preferably carried out at low temperature so that the aromatic coffee substance is not scattered or degraded during the process. More specifically, it is preferable to carry out the emulsifying, slurry forming and dehydrating steps at a temperature which is equal to or lower than room temperature, i.e., at about 18° C. or lower, more preferably at 10° C. or lower.

The fixed particles of aromatic coffee substance obtained by the method of the present invention are usually mixed with an instant coffee powder, but may also be added to a coffee beverage in a small amount when it is to be drunk.

The present invention will be described hereinunder in acetone and more detail by way of Experimental Examples and Examples.

EXAMPLE 1 Stabilization Of Aromatic Substance By Use Of MCT

A product prepared by the method of Example 1 (described later) was compared with a control product prepared by using castor oil in place of MCT for the agglutination bath in order to examine the storage stability of the aromatic coffee substance in each of the products. The results are shown in Table 1 below.

TABLE 1

| EFFECT OF MCT ON STORAGE STABILITY | | | | |
|---|---|---|---|---|
| Oil Components Used For Agglutination Bath | MCT | | Castor Oil | |
| Water content (%) of final dried product | 5.0 | 7.5 | 5.0 | 7.5 |
| Storage temperature (°C.) | −20 | −20 | −20 | −20 |
| Storage time (days) | 10 | 10 | 10 | 10 |
| Change in fragrance | no change | subtly offensive smell | remarkably offensive smell | considerably offensive smell |

EXAMPLE 2

Effect On Turbidity Obtained By Use Of MCT

The turbidity of coffee beverage at the time when final capsuled particles were dissolved therein was measured for each of the samples and controls to examine the effect on the turbidity of MCT compounded into a solvent for preparing an oleaginous solution of an aromatic coffee substance.

Three samples of encapsulated particles were prepared in accordance with the method of Example 1 and by the use of the following three different kinds of solvent for an aromatic coffee substance (coffee essence): coffee oil alone (Sample 1); a mixture of coffee oil and MCT mixed in the weight ratio 40:60 (Sample 2); and a mixture of coffee oil and MCT mixed in the weight ratio 20:80 (Sample 3). The particles thus prepared were mixed with a commercially available instant coffee powder, and each mixture was dissolved in hot water to prepare a coffee beverage. The tubidity of each coffee beverage was measured with a turbidimeter.

The results are shown in Table 2. In this table, the larger the value of the reading on the turbidimeter, the higher the transparency.

TABLE 2

| Samples | Coffee Beverages | Turbidimeter | Observation |
|---|---|---|---|
| 1 | 1.3% coffee solution + capsules (0.3% coffee oil) | 2.3 ± 0.2 | turbid (unacceptable) |
| 2 | 1.3% coffee solution + capsules [0.3% (coffee oil/MCT; 40/60)] | 4.0 ± 0.2 | acceptable although slightly turbid |
| 3 | 1.3% coffee solution + | 5.0 ± 0.2 | almost |

TABLE 2-continued

| Samples | Coffee Beverages | Turbidimeter | Observation |
| --- | --- | --- | --- |
| | capsules [0.3% (coffee oil/MCT; 20/80)] | | transparent |
| Control 1 (commercially available instant coffee: manufactured by A) | 1.3% coffee solution | 4.2 ± 0.2 | acceptable although slightly turbid |
| Control 2 (commercially available instant coffee: manufactured by B) | 1.3% coffee solution | 12.8 ± 0.2 | nearly completely transparent |

EXAMPLE 1

(1) Fifty grams of gum arabic and 50 g of water were thoroughly stirred to prepare a 50%-gum arabic aqueous solution of high viscosity, and the solution was cooled in an ice bath so that the temperature of the solution was 10° C.

(2) Separately, 10 g of coffee flavor oil, 10 g of medium chain triglyceride (MCT) and 3 g of coffee essence were intimately mixed, and the mixture was cooled to 10° C.

(3) The solution prepared in (1) was put in a (Waring) blender, and the oleaginous solution prepared in (2) was poured into this blender. While the (Waring) blender was cooled with ice water so that the solution temperature was held at 10° C., high-speed stirring was carried out at 120 rpm for 25 minutes to emulsify the solution mixture.

(4) Separately, 200 g of MCT and 1000 g of 99.8%-anhydrous ethanol were thoroughly stirred in a container, and the mixture was cooled in an ice bath so that the temperature of the mixture was 10° C.

(5) The emulsion obtained in (3) was gently dropped into the solution mixture prepared in (4) in such a manner that the emulsion was dropped in the shape of a thread having a diameter of 1 to 2 mm, thereby encapsulating the droplets of the emulsion. The agglutination solution was slowly stirred by means of a stirrer so that the encapsulated aggregate particles were not bound together. Settled capsules were maintained in this state for five minutes and then collected by means of filtration.

(6) The collected capsules were suction-filtered and added to 500 cc of 99.8%-ethanol cooled at 10° C. where the capsules were allowed to stand for 10 minutes under gentle stirring to effect dehydration. The dehydrated capsules were collected by suction filtration and continuously subjected to suction so as to be air-dried.

(7) Thereafter, the capsules were put in a circulation drier, and drying was continued for 2 hours at 25° C. The drying process was suspended at the time the water content in the capsules reached about 5.5% or less.

The dried capsules thus obtained were ground in a mortar or the like and sifted using a 12-mesh screen in order to make the particle size uniform.

EXAMPLE 2

(1) Two grams of synthetic coffee essence (prepared by adding coffee aroma in the form of a synthetic additive to ethanol) and 15 g of MCT were intimately mixed, and the mixture was cooled to 10° C.

(2) A 50%-gum arabic aqueous solution of high viscosity (10° C.) prepared under the condition described in (1) in Example 1 was put in a waring blender, and the oleaginous solution prepared in the above-described (1) was poured into the blender. While the waring blender was cooled with ice water, high-speed stirring was effected at 120 rpm for 25 minutes to emulsify the solution mixture.

(3) Separately, 300 g of MCT and 1100 cc of 99.8%-ethanol were thoroughly stirred in a container, and the container was dipped in a cold water bath in order to cool the contained solution to 10° C.

(4) The emulsion obtained in (2) was dropped into the solution prepared in (3) in such a manner that the emulsion was dropped in the shape of a thread having a diameter of 1 to 2 mm, thereby encapsulating the droplets of the emulsion. The solution was gently stirred in order to prevent the encapsulated aggregate particles from binding together, and the capsules were thus settled. The capsules were allowed to stand for 5 minutes in the settled state and then collected by means of centrifugal separation.

(5) The collected thread-like-capsules were added to 500 cc of 99.8%-ethanol (10° C.) and allowed to stand for 10 minutes to effect dehydration. Thereafter, the capsules were collected by suction filtration and continuously subjected to suction so as to be air-dried.

(6) The dehydrated capsules were put in a circulation drier, and drying was continued for 2.5 hours at 25° C. The drying process was suspended when it was confirmed that the water content reached 5.5% or less. The capsules were ground by means of a small grinder and then sifted using a 16-mesh screen in order to make the particle size uniform.

I claim:

1. In a method of fixing an aromatic coffee substance comprising homogenizing an oleaginous solution of the aromatic coffee substance and a non-protein hydrophilic colloidal aqueous solution to form an emulsion, extruding or dropping said emulsion in the shape of a thread through a small bore into an agglutination-solution which is non-toxic and insoluble in the discontinuous phase of said emulsion while stirring said solution to form a capsuled substance, then dehydrating and drying this capsuled substance to obtain capsuled particles;

The improvement which comprises using as a solvent for said oleaginous solution of the aromatic coffee substance, a medium chain triglyceride wherein the fatty acid portion consists of a fatty acid having from 6 to 12 carbon atoms or a mixture of coffee oil and said medium chain triglyceride in a weight ratio of coffee oil to said triglyceride of about 40:60 to about 20:80, and said agglutination solution containing from about 5 to about 50% of a medium chain triglyceride wherein the fatty acid portion consists of a fatty acid containing from 6 to 12 carbon atoms.

2. A fixing method according to claim 1, wherein said oleaginous solution of the aromatic coffee substance is prepared by dissolving said aromatic coffee substance in a medium chain triglyceride.

3. A fixing method according to claim 1, wherein said oleaginous solution of the aromatic coffee substance contains as a solvent a mixture of a medium chain triglyceride and coffee oil.

4. A fixing method according to claim 1, wherein said agglutination solution is a mixture of a medium chain triglyceride and ethanol.

5. A fixing method according to claim 1, wherein the amount of said medium chain triglyceride is from 5 to 20% by weight of said agglutination solution.

6. A fixing method according to claim 1, wherein the formation of said emulsion, the agglutination of the dispersion phase of said emulsion and the dehydration of said capsuled substance are carried out at any temperature between 0° C. and room temperature, and the final drying step is carried out at a temperature of 70° C. or lower.

* * * * *